(12) United States Patent
Lin et al.

(10) Patent No.: US 9,537,369 B2
(45) Date of Patent: Jan. 3, 2017

(54) MOTOR (71) Applicant: Sheng-Lian Lin, Taoyuan County (TW)

(72) Inventors: Sheng-Lian Lin, Taoyuan County (TW); Yu-Ying Lin, Taoyuan County (TW)

(73) Assignee: Sheng-Lian Lin, Taoyuan County (TW)

( * ) Notice: Subject to any disclaimer, the term of this patent is extended or adjusted under 35 U.S.C. 154(b) by 330 days.

(21) Appl. No.: 14/459,812

(22) Filed: Aug. 14, 2014

(65) Prior Publication Data
US 2015/0054368 A1    Feb. 26, 2015

(30) Foreign Application Priority Data

Aug. 20, 2013 (TW) .............................. 102129855 A
May 6, 2014 (TW) .............................. 103116129 A (51) Int. Cl.
*H02K 1/27* (2006.01)
*H02K 7/09* (2006.01)

(52) U.S. Cl.
CPC .............. *H02K 7/09* (2013.01); *H02K 1/278* (2013.01)

(58) Field of Classification Search
CPC ................................. H02K 7/09; H02K 1/278
USPC ............ 310/156.04, 156.07, 156.09, 156.28, 310/156.36, 156.43, 156.49, 90.5; 29/598
See application file for complete search history.

(56) References Cited

U.S. PATENT DOCUMENTS

| 3,110,462 A * | 11/1963 | Abendroth ................ B61L 5/06 |
| | | 246/240 |
| 5,363,004 A | 11/1994 | Futami et al. |
| 5,808,839 A * | 9/1998 | Dunfield ............. F16C 32/0425 |
| | | 360/265.4 |
| 6,680,553 B1 * | 1/2004 | Takano .................... H02K 3/50 |
| | | 310/156.05 |
| 7,170,209 B2 * | 1/2007 | Araki .................. H02K 1/2766 |
| | | 29/598 |

(Continued)

FOREIGN PATENT DOCUMENTS

| CN | 1677808 | 10/2005 |
| CN | 202772712 | 3/2013 |

(Continued)

OTHER PUBLICATIONS

Machine translation of JP2000278894; Sekino et al. Oct. 2000. Japan.*

(Continued)

*Primary Examiner* — Joshua Benitez-Rosario
*Assistant Examiner* — Ahmed Elnakib
(74) *Attorney, Agent, or Firm* — WPAT, PC; Justin King (57) ABSTRACT

A motor includes a rotor module and a stator module. The rotor module includes a plurality of first magnet units, a plurality of second magnet units, a hollow magnetic conductance pillar and a rotating shaft. The first and second magnet units are alternately arranged to form a hollow pillar. An outer surface of the hollow pillar includes a plurality of first surfaces and second surfaces of the first and second magnet units. The first and second surfaces have different magnetic poles. The hollow magnetic conductance pillar and the rotating shaft are disposed in and through the hollow pillar and the hollow magnetic conductance pillar, respectively. The stator module includes a shell and a coil unit. The rotor module is disposed in the shell and the rotating shaft is extended out of the shell. The coil unit is disposed on an inner surface of the shell and around the rotor module.

7 Claims, 6 Drawing Sheets

(56) References Cited

U.S. PATENT DOCUMENTS

| | | | | |
|---|---|---|---|---|
| 7,394,174 B2* | 7/2008 | Blase | ............... | F02M 37/08 |
| | | | | 310/156.05 |
| 2009/0001839 A1* | 1/2009 | Masayuki | ............ | H02K 29/08 |
| | | | | 310/156.16 |
| 2009/0033174 A1 | 2/2009 | Niguchi et al. | | |
| 2009/0140591 A1* | 6/2009 | Blessing | ............ | H02K 21/029 |
| | | | | 310/156.37 |
| 2010/0052457 A1* | 3/2010 | Brahmavar | ......... | H02K 1/2733 |
| | | | | 310/156.13 |
| 2011/0298325 A1 | 12/2011 | Rombach | | |

FOREIGN PATENT DOCUMENTS

| | | | |
|---|---|---|---|
| EP | 2128963 | | 12/2009 |
| JP | 49-131505 | * | 3/1948 |
| JP | 63-225721 | * | 9/1988 |
| TW | M317117 | | 8/2007 |
| TW | 201044749 | | 12/2010 |
| TW | 201115882 | | 5/2011 |
| WO | 0113499 | | 2/2001 |

OTHER PUBLICATIONS

Machine translation of JP2012097891; Tamaki, May 2012. Japan.*
International Search Authority, "Search Report", Dec. 31, 2014.

* cited by examiner

MOTOR

FIELD OF THE INVENTION

The present invention relates to a motor, and more particularly to a motor used in power generation equipment.

BACKGROUND OF THE INVENTION

Innovation, research and development for the improvement of motor output power are one of the major concerns since the beginning of the development of motors. Generally, the improvement of the motor output power may be realized by directly increasing the motor specifications. However, a higher motor output power may lead to a heavier motor weight and a larger motor size, and the way for increasing the motor output power directly through the increase of motor specifications may not suitable for some living supplies or industrial equipments. Thus, for those ordinarily skilled in the art, it is an important object to develop a motor with higher power conversion efficiency.

SUMMARY OF THE INVENTION

One aspect of the present invention is to provide a motor having improved energy conversion efficiency.

The present invention provides a motor, which includes a rotor module and a stator module. The rotor module includes a plurality of first magnet units, a plurality of second magnet units, a hollow magnetic conductance pillar and a rotating shaft. The second magnet units and the first magnet units are alternately arranged to form a hollow pillar. An outer surface of the hollow pillar includes a plurality of first surfaces of the first magnet units and a plurality of second surfaces of the second magnet units. The first surfaces and the second surfaces have different magnetic poles. The hollow magnetic conductance pillar is disposed in and through the hollow pillar. The rotating shaft is disposed in and through the hollow magnetic conductance pillar. The stator module includes a shell and a coil unit. The rotor module is disposed in the shell and the rotating shaft is extended out of the shell. The coil unit is disposed on an inner surface of the shell and around the rotor module.

In one embodiment, an inner surface of the hollow magnetic conductance pillar is dispose with at least an engagement portion. The rotating shaft includes at least an engagement slot. The engagement portion and the engagement slot are configured to be engaged with each other thereby coupling the hollow magnetic conductance pillar and the rotating shaft with each other.

In one embodiment, the hollow magnetic conductance pillar includes a plurality of serially-stacked annular silicon steel sheets. An inner surface of the hollow pillar is disposed with a plurality of slits. The first and second magnet units are configured to be engaged with the hollow magnetic conductance pillar through the slits.

In one embodiment, the rotor module further includes a coating portion configured to coat the hollow pillar.

In one embodiment, the aforementioned motor further includes two magnetic bearings, which are disposed on a top portion and a bottom portion of the shell respectively and configured to support the rotor module. Each magnetic bearing includes a fixing portion and a rotating portion. The fixing portion is disposed on either the top portion or the bottom portion of the shell and includes a third surface and a fourth surface connected with each other. The third surface faces to the hollow pillar and couples to the hollow magnetic conductance pillar thereby forming a composite structure. The fourth surface faces to and surrounds the rotating shaft. The rotating portion is mounted on the rotating shaft and surrounded by the fixing portion. The rotating portion includes a fifth surface and a sixth surface connected with each other. The fifth surface faces to the third surface. The sixth surface faces to the fourth surface. The third surface and the fifth surface have the same magnetic pole. The fourth surface and the sixth surface have the same magnetic pole.

In one embodiment, a first end of the rotating shaft passes through the fixing portion and the rotating portion of a first of the plurality of magnetic bearings and extends out of the shell. The rotating portion of a second of the plurality of magnetic bearing coats a second end of the rotating shaft.

In one embodiment, two ends of the rotating shaft pass through the fixing portions and the rotating portions of the magnetic bearings and extend out of the shell.

In one embodiment, the aforementioned motor further includes a first annular magnet unit and a second annular magnet unit. The first annular magnet unit is disposed on a surface of the composite structure. The surface of the composite structure faces to the top portion or the bottom portion of the shell. The first annular magnet unit includes a plurality of first sheet magnets and a plurality of second sheet magnets. The first sheet magnets and the second sheet magnets are alternately arranged. The second annular magnet unit is disposed on the fixing portion of one of plurality of magnetic bearings and corresponding to the first annular magnet unit. The second annular magnet unit includes a plurality of third sheet magnets and a plurality of fourth sheet magnets. The third sheet magnets and the fourth sheet magnets are alternately arranged. A surface, facing to the second annular magnet unit, of the first sheet magnets and a surface, facing to the second annular magnet unit, of the second sheet magnets have different magnetic poles. A surface, facing to the first annular magnet unit, of the third sheet magnets and a surface, facing to the first annular magnet unit, of the fourth sheet magnets have different magnetic poles.

In one embodiment, each first magnet unit and each second magnet unit respectively includes a plurality of sheet magnets. The sheet magnets are serially stacked in a direction from the outer surface of the hollow pillar toward an inner surface of the hollow pillar. In each first magnet unit, two contacting surfaces of the adjacent two sheet magnets have the same magnetic pole. In each second magnet unit, two contacting surfaces of the adjacent two sheet magnets have the same magnetic pole.

In summary, through forming the hollow pillar by arranging the first magnet units and the second magnet units in an alternating manner and disposing the hollow magnetic conductance pillar in the hollow pillar, the motor of the present invention can have improved energy conversion efficiency. In addition, because the rotating module is supported by non-contact force, there will be no friction while the rotor module is rotating. Thus, the heat and energy loss issues caused by the friction are avoided; and consequentially, the reliability and the energy conversion efficiency of the motor of the present invention are improved. Moreover, because the rotation of the rotor module is benefited from the repulsion or attraction generated between the first annular magnet unit and the second annular magnet unit, consequentially the energy conversion efficiency of the motor of the present invention is further improved.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
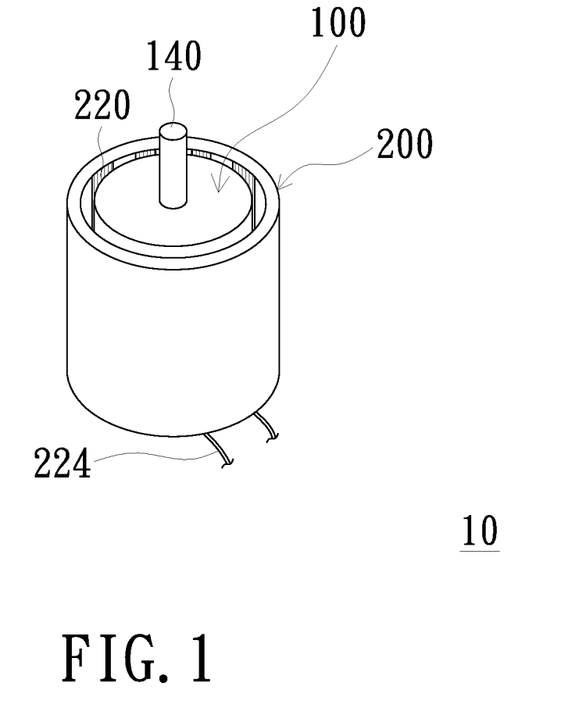
FIG. 1 is a perspective schematic view of a motor according to an embodiment of the present invention.
Figure 2:
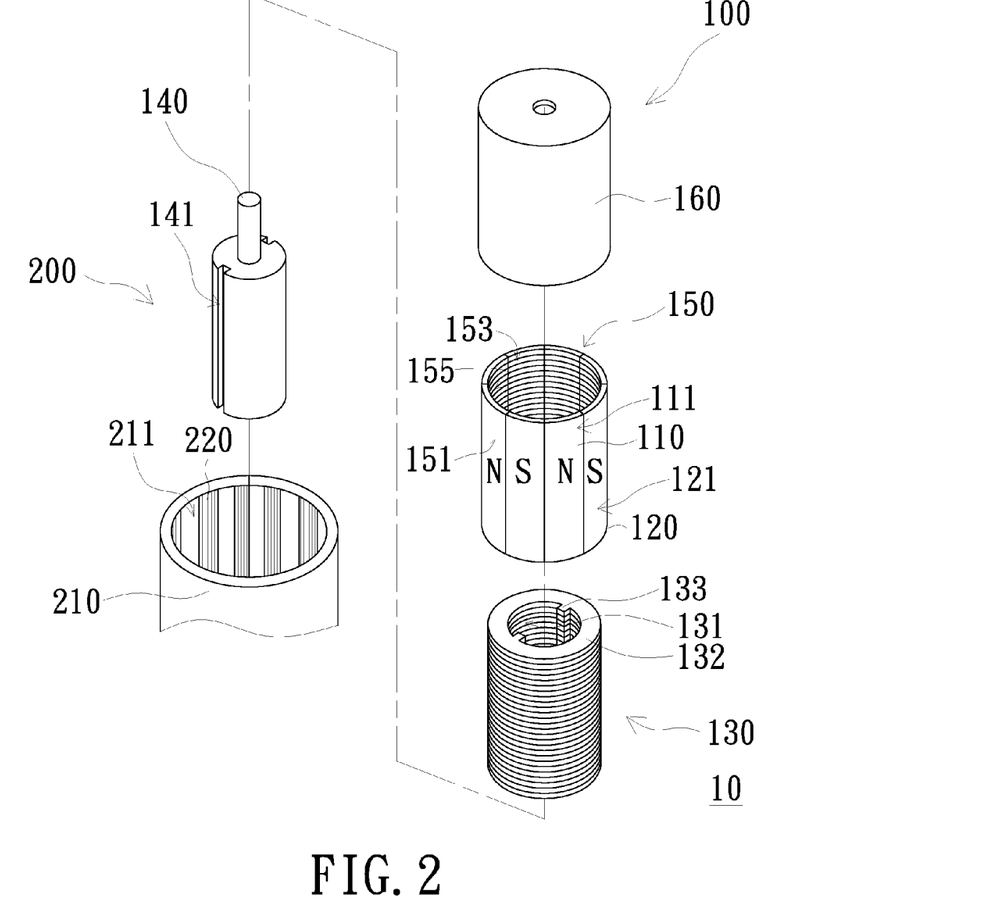
FIG. 2 is an exploded view of the motor of FIG. 1.

FIG. 1 is a perspective schematic view of a motor according to an embodiment of the present invention. FIG. 2 is an exploded view of the motor of FIG. 1. Please refer to FIGS. 1 and 2. The motor 10 in the present embodiment includes a rotor module 100 and a stator module 200. The rotor module 100 includes a plurality of first magnet units 110, a plurality of second magnet units 120, a hollow magnetic conductance pillar 130 and a rotating shaft 140. The first magnet units 110 and the second magnet units 120 are alternately arranged thereby forming a hollow pillar 150. An outer surface 151 of the hollow pillar 150 includes a plurality of first surfaces 111 of the first magnet units 110 and a plurality of second surfaces 121 of the second magnet units 120. The first surfaces 111 and the second surfaces 121 have different magnetic poles. The hollow magnetic conductance pillar 130 is disposed in and through the hollow pillar 150. The rotating shaft 140 is disposed in and through the hollow magnetic conductance pillar 130. The stator module 200 includes a shell 210 and a coil unit 220. The rotor module 100 is disposed in the shell 210 and the rotating shaft 140 is extended out of the shell 210. The coil unit 220 is disposed on the inner surface 211 of the shell 210 and around the rotor module 100.

In this embodiment, the magnetic pole of the first surfaces 111 of the first magnet units 110 is N; and the magnetic pole of the second surfaces 121 is S. The number of the first magnet units 110 may be equal to the number of the second magnet units 120. As described above, the first magnet units 110 and the second magnet units 120 are alternately arranged thereby forming the hollow pillar 150. Specifically, in this embodiment, the hollow pillar 150 is formed by bonding the first magnet units 110 with the second magnet units 120 in an alternating manner. In other words, both sides of each first magnet unit 110 are bonded with respective second magnet units 120; and both sides of each second magnet unit 120 are bonded with respective first magnet units 110.

In this embodiment, the hollow magnetic conductance pillar 130 may include a plurality of serially-stacked annular silicon steel sheets 132, which are stacked in a pile manner. Correspondingly, the inner surface 155 of the hollow pillar 150 is disposed with a plurality of slits 153. The arrangement of the slits 153 corresponds to the thickness of the annular silicon steel sheet 132. Thus, through the slits 153 and the corresponding annular silicon steel sheets 132, the hollow pillar 150 and the hollow magnetic conductance pillar 130 can be engaged with each other without being easily separated. In this embodiment, for the formation of the hollow magnetic conductance pillar 130, the annular silicon steel sheet 132 is selected due to its great permeability; however, the material of the hollow magnetic conductance pillar 130 in the present invention is not limited thereto. Moreover, at least one engaging portion 133 is formed on the inner surface 131 of the hollow magnetic conductance pillar 130 and at least one engaging slot 141 is formed on the rotating shaft 140; wherein the arrangement of the engaging slot(s) 141 is corresponding to the engaging portion(s) 133 of the hollow magnetic conductance pillar 130. In this embodiment, there are two engaging portions 131 and two corresponding engaging slots 141; and the two engaging portions 131 are configured to be engaged with the two respective engaging slots 141 thereby realizing the engagement of the hollow magnetic conductance pillar 130 and the rotating shaft 140. Moreover, the rotor module 100 further includes a coating portion 160 for coating the hollow pillar 150. In this embodiment, the coating portion 160 is, for example, a shell; and the rotating shaft 140 is extended out of the coating portion 160. In another embodiment, the coating portion may be a coating layer (not shown) which is for coating the hollow pillar 150.

Figure 3:
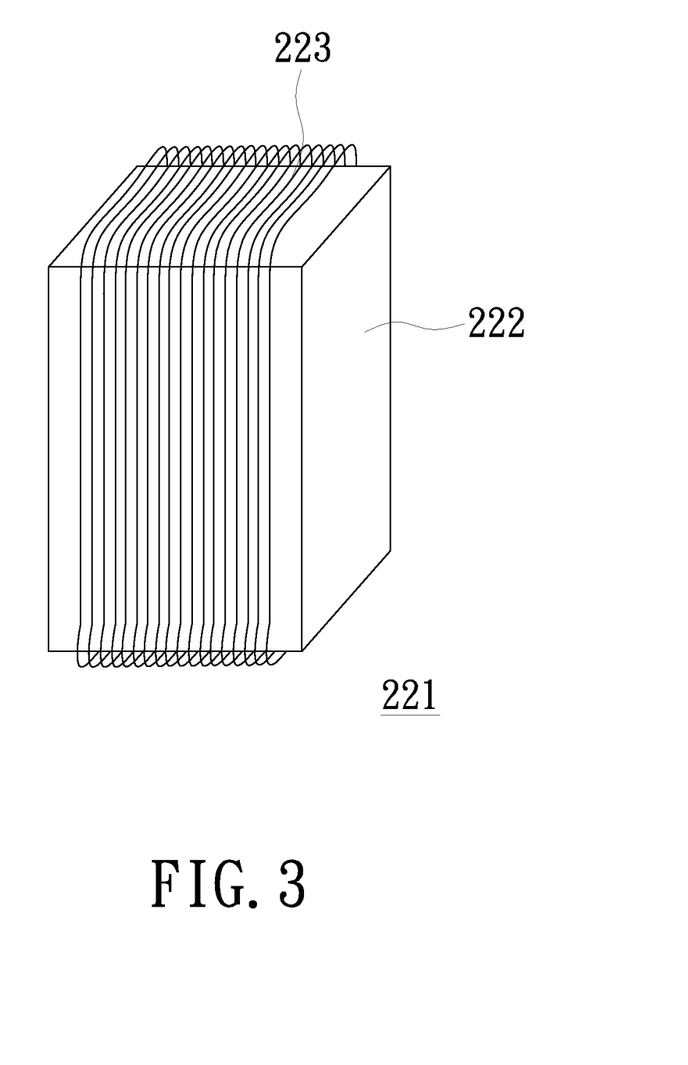
FIG. 3 is a perspective schematic view of a coil component of the coil unit 220 shown in FIG. 1.

FIG. 3 is a perspective schematic view of a coil component of the coil unit 220 shown in FIG. 1. Please refer to FIGS. 1 and 3. The coil unit 220 of the stator module 200 includes a plurality of coil components 221 (FIG. 3). Each coil component 221 includes a silicon steel sheet 222 and a coil 223 winding around the silicon steel sheet 222. These coil components 221 are disposed around the inner surface 211 of the shell 210. In one embodiment, a coating layer (not shown) is provided to coat the coil unit 220 thereby covering the coil unit 220 in the coating layer. Moreover, the coil unit 220 may further include a wire 224 connected to the coil components 221. When the motor 10 is configured to convert electrical energy into mechanical energy, the electrical energy can be supplied to the coil components 221 through the wire 224 thereby driving the rotor module 100 to rotate. Alternatively, when the motor 10 is configured to convert kinetic energy into electrical energy, the generated electrical energy can be outputted through the wire 224.

In summary, through forming the hollow pillar 150 by arranging the first magnet units 110 and the second magnet units 120 in an alternating manner and disposing the hollow magnetic conductance pillar 130 in the hollow pillar 150, the motor 10 in this embodiment can have improved energy conversion efficiency.

Figure 4:
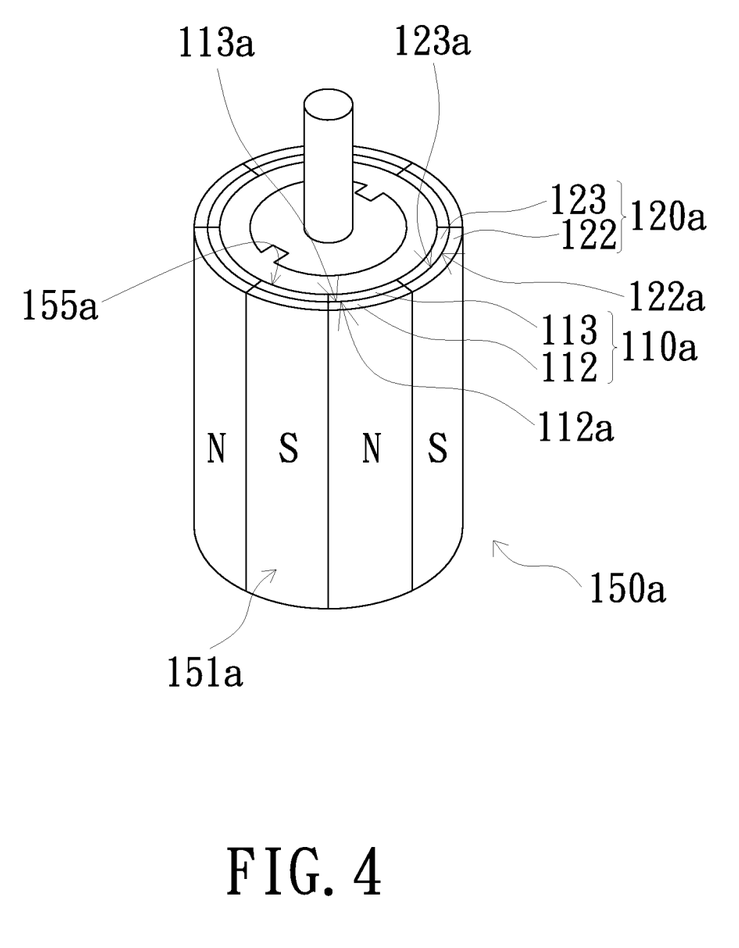
FIG. 4 is a perspective schematic view of a rotor module of a motor according to another embodiment of the present invention.

To further improve the energy conversion efficiency of a motor, it is to be noted that the first and second magnet units may include a plurality of magnetic sheets. As shown in FIG. 4, each first magnet unit 110a includes a plurality of magnetic sheets; specifically, each first magnet unit 110a is exemplified by including two magnetic sheets 112 and 113 in this embodiment. Similarly, each second magnet unit 120a includes a plurality of magnetic sheets; specifically, each second magnet unit 120a is exemplified by including two magnetic sheets 122 and 123 in this embodiment. As described above, the first magnet units 110a and the second magnet units 120a are alternatively arranged thereby forming the hollow pillar 150a. The magnetic sheets 112 and 113 of each first magnet unit 110a and the magnetic sheets 122 and 123 of each second magnet unit 120a are serially stacked in a direction from the outer surface 151a of the hollow pillar 150a to the inner surface 155a of the hollow pillar 150a. The two contacting surfaces 112a and 113a of the adjacent two magnetic sheets 112 and 113 have the same magnetic pole (i.e. N) and are bonded with each other in an adhering manner. Similarly, the two contacting surfaces 122a and 123a of the adjacent two magnetic sheets 122 and 123 have the same magnetic pole (i.e. S) and are bonded with each other in an adhering manner.

Figure 5:
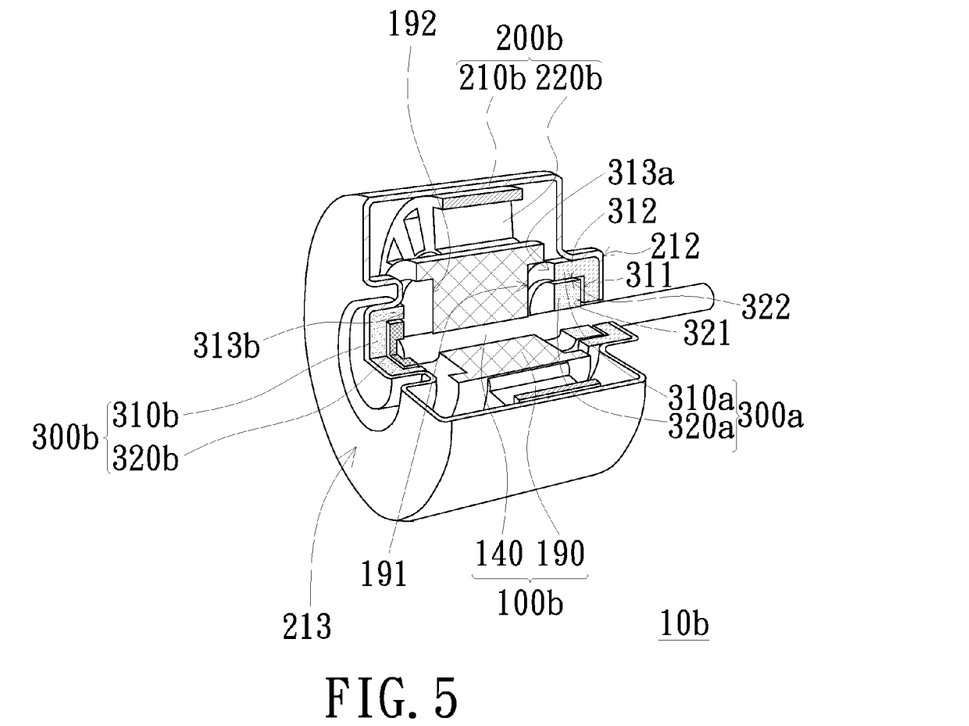
FIG. 5 is a cross-sectional view of a portion of a motor according to another embodiment of the present invention.

FIG. 5 is a cross-sectional view of a portion of a motor according to another embodiment of the present invention. Please refer to FIG. 5. The motor 10b of this embodiment includes a rotor module 100b and a stator module 200b. Similar to the aforementioned rotor module 100, the rotor module 100b also includes the first magnet unit, the second magnet unit, the hollow magnetic conductance pillar and the rotating shaft 140. To simplify the FIG. 5, the first magnet unit, the second magnet unit and the hollow magnetic conductance corporately form a composite structure 190. The outer layer of the composite structure 190 is a coating portion formed by a coating layer. The detailed structures of the first magnet unit, the second magnet unit and the hollow magnetic conductance are described in the aforementioned embodiments, and no redundant detail is to be given herein. Similar to the aforementioned stator module 200, the stator module 200b also includes the shell 210b and the coil unit 220b. In FIG. 5, the plurality of silicon steel sheets of the coil unit 220b and the coils winding around the silicon steel sheets are illustrated as one integral structure. The detailed structures of the silicon steel sheets and the coils winding around the silicon steel sheets are described in the aforementioned embodiments, and no redundant detail is to be given herein.

As shown in FIG. 5, the motor 10b in this embodiment further includes two magnetic bearings 300a and 300b, which are disposed on the top portion 212 and the bottom portion 213 of the shell 210b respectively and are provided to support the rotor module 100b. The magnetic bearing 300a includes a fixing portion 310a and a rotating portion 320a. The magnetic bearing 300b includes a fixing portion 310b and a rotating portion 320b. The fixing portion 310a of the magnetic bearing 300a is disposed on the top portion 212 of the shell 210b. The fixing portion 310 of the magnetic bearing 300b is disposed on the bottom portion 213 of the shell 210b. Each fixing portion 310a/310b has a third surface 311 and a fourth surface 312 connected with each other. The third surface 311 faces to the composite structure 190 constituted by the hollow pillar and the hollow magnetic conductance pillar. The fourth surface 312 faces to and surrounds the rotating shaft 140. Each rotating portion 320a/320b is mounted to the rotating shaft 140 and surrounded by the fixing portion 310a/310b. The rotating portion 320a/320b has a fifth surface 321 and a sixth surface 322 connected with each other. The fifth surface 321 faces to the third surface 311, and the sixth surface 322 faces to the fourth surface 312. The third surface 311 and the fifth surface 321 have the same magnetic pole (i.e. both are S or both are N) thereby generating repulsion therebetween. The fourth surface 312 and the sixth surface 322 have the same magnetic pole (i.e. both are S or both are N) thereby generating repulsion therebetween. Specifically, two magnets (not shown) may be arranged in the fixing portion 310a/310b and close to the third surface 311 and the fourth surface 312 respectively thereby forming the magnetic poles of the third surface 311 and the fourth surface 312. Similarly, two magnets (not shown) may be arranged in the rotating portion 320a/320b and close to the fifth surface 321 and the sixth surface 322 respectively thereby forming the magnetic poles of the fifth surface 321 and the sixth surface 322. In one embodiment, the third surface 311 and the fourth surface 312 may have the same magnetic pole. In another embodiment, the third surface 311 and the fourth surface 312 may have the different magnetic poles.

Through the balance between the magnet repulsions, the rotor module 100b in the motor 10b can be prevented from having offset. In addition, because the rotating module 100b is supported by non-contact force, there will be no friction while the rotor module 100b is rotating. Thus, the heat and energy loss issues caused by the friction are avoided; and consequentially, the reliability and the energy conversion efficiency of the motor 10b are improved.

In this embodiment as shown in FIG. 5, one end of the rotating shaft 140 passes through the fixing portion 310a and the rotating portion 320a of the magnetic bearing 300a and extends out of the shell 210b, and the other end of the rotating shaft 140 is coated by the rotating portion 320b of the magnetic bearing 300b. However, in another embodiment, both of the two ends of the rotating shaft 140 extend out of the shell 210; the bottom portion 213 and the top portion 212 of the shell 210b have the same structure; both of the bottom portion 213 and the top portion 212 are disposed with the magnetic bearing 300a thereby allowing the rotating shaft 140 to pass through the magnetic bearing 300a and extend out of the shell 210b.

Figure 6:
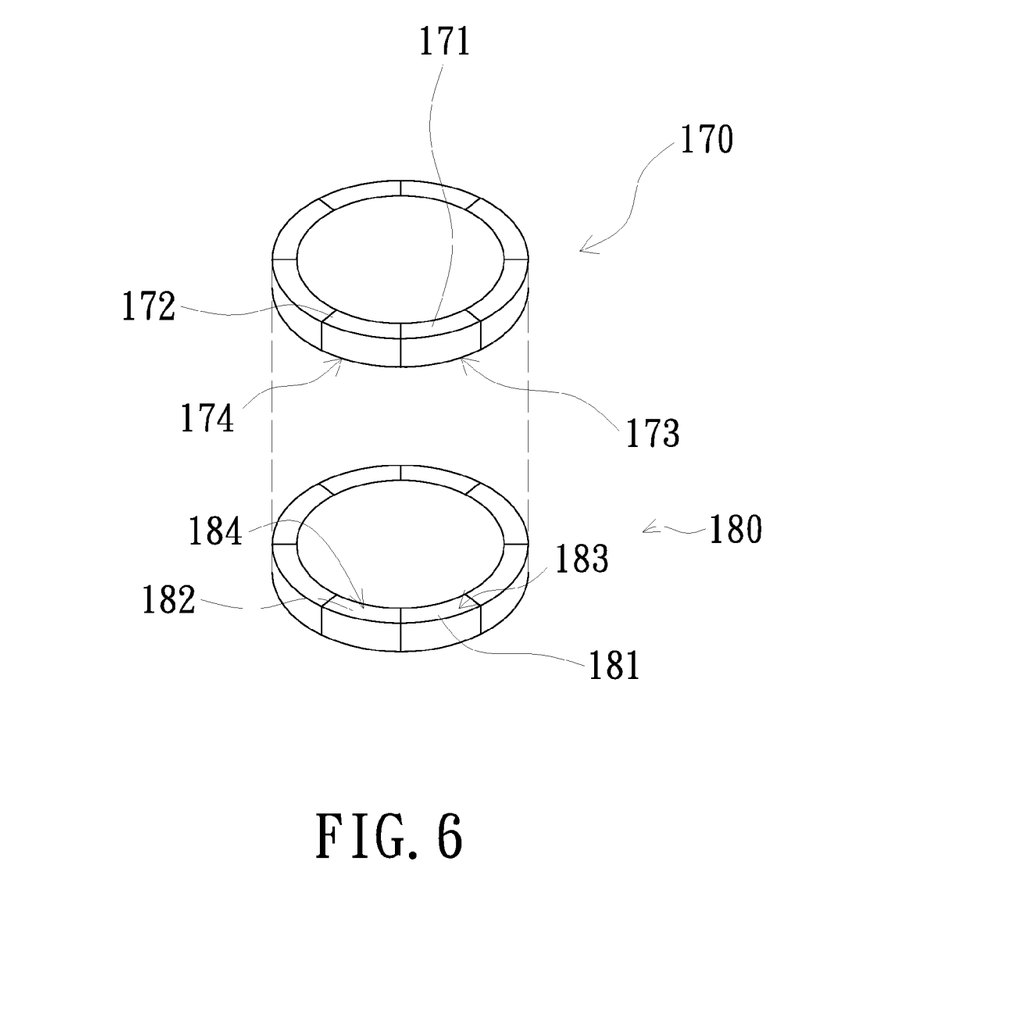
FIG. 6 is a perspective schematic view of the first annular magnet unit and the second annular magnet unit.

To further improve the energy conversion efficiency, the motor 10b in one embodiment may further a first annular magnet unit 170 and a second annular magnet unit 180 as shown in FIG. 6. The first annular magnet unit 170 may be disposed on the surface 191, facing to the top portion 212 of the shell 210b, of the composite structure 190 or the surface 192, facing to the bottom portion 213 of the shell 210b, of the composite structure 190. In addition, the first annular magnet unit 170 may be disposed inside or outside the composite structure 190. The second annular magnet unit 180 is disposed on the fixing portion 310a or 310b of the magnetic bearing 300a or 300b and corresponding to the position of the first annular magnet unit 170. Specifically, when the first annular magnet unit 170 is disposed on the surface 191, the second annular magnet unit 180 may be disposed on the surface 313a of the fixing portion 310a, regardless in the internal or the external of the fixing portion 310a. When the first annular magnet unit 170 is disposed on the surface 192, the second annular magnet unit 180 may be disposed on the surface 313b of the fixing portion 310b, regardless in the internal or the external of the fixing portion 310b.

The first annular magnet unit 170 includes a plurality of first sheet magnets 171 and a plurality of second sheet magnets 172, which are alternately arranged. The surface 173, facing to the second annular magnet unit 180, of each first sheet magnet 171 and the surface 174, facing to the second annular magnet unit 180, of each second sheet magnet 172 have different magnet poles. For example, the surface 173 may have magnet pole N and the surface 174 may have magnet pole S. The second annular magnet unit 180 includes a plurality of third sheet magnets 181 and a plurality of fourth sheet magnets 182, which are alternately arranged. The surface 183, facing to the first annular magnet unit 170, of each third sheet magnet 181 and the surface 184, facing to the first annular magnet unit 170, of each fourth sheet magnet 182 have different magnet poles. For example, the surface 183 may have magnet pole S and the surface 184 may have magnet pole N. In one embodiment, the number of the first sheet magnets 171 may be equal to the number of the first magnet units 110 and the number of the second sheet magnets 172 may be equal to the number of the second magnet units 120; however, the present invention is not limited thereto.

The first annular magnet unit 170 is driven to rotate with the rotor module 100b and the second annular magnet unit 180 is still without a movement. Thus, the rotation of the rotor module 100b is benefited from the repulsion or attraction generated between the first annular magnet unit 170 and the second annular magnet unit 180, while the rotor module 100b is rotating; and consequentially, the energy conversion efficiency of the motor 10b is further improved. It is to be noted that, the first annular magnet unit 170 and the second annular magnet unit 180 may also apply to the motors disclosed in the aforementioned embodiments. In addition, the second annular magnet unit 180 is not limited to be disposed on the fixing portion 310a/310b of the magnetic bearing 300a or 300b. In other words, the second annular magnet unit 180 may be disposed in the top portion or the bottom portion of the respective motor in response to an actual design requirement.

In summary, through forming the hollow pillar by arranging the first magnet units and the second magnet units in an alternating manner and disposing the hollow magnetic conductance pillar in the hollow pillar, the motor of the present invention can have improved energy conversion efficiency. In addition, because the rotating module is supported by non-contact force, there will be no friction while the rotor module is rotating. Thus, the heat and energy loss issues caused by the friction are avoided; and consequentially, the reliability and the energy conversion efficiency of the motor of the present invention are improved. Moreover, because the rotation of the rotor module is benefited from the repulsion or attraction generated between the first annular magnet unit and the second annular magnet unit, consequentially the energy conversion efficiency of the motor of the present invention is further improved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A motor, comprising:
   a rotor module, comprising:
      a plurality of first magnet units;
      a plurality of second magnet units, wherein the second magnet units and the first magnet units are alternately arranged to form a hollow pillar, an outer surface of the hollow pillar comprises a plurality of first surfaces of the first magnet units and a plurality of second surfaces of the second magnet units, the first surfaces and the second surfaces have different magnetic poles;
      a hollow magnetic conductance pillar, disposed in and through the hollow pillar; and
      a rotating shaft, disposed in and through the hollow magnetic conductance pillar;
   a stator module, comprising:
      a shell, wherein the rotor module is disposed in the shell and the rotating shaft is extended out of the shell; and
      a coil unit, disposed on an inner surface of the shell and around the rotor module;
   two magnetic bearings, disposed on a top portion and a bottom portion of the shell respectively and configured to support the rotor module, wherein each magnetic bearing comprises:
      a fixing portion, disposed on either the top portion or the bottom portion of the shell and comprising a third surface and a fourth surface connected with each other,
      wherein the third surface faces the hollow pillar, and the hollow pillar couples to the hollow magnetic conductance pillar thereby forming a composite structure, the fourth surface faces to and surrounds the rotating shaft; and
      a rotating portion, mounted on the rotating shaft and surrounded by the fixing portion, the rotating portion comprising a fifth surface and a sixth surface connected with each other, wherein the fifth surface faces to the third surface, the sixth surface faces to the fourth surface, the third surface and the fifth surface have the same magnetic pole, and the fourth surface and the sixth surface have the same magnetic pole;
   a first annular magnet unit, disposed on an surface of the composite structure, wherein the surface of the composite structure faces to the top portion or the bottom portion of the shell, the first annular magnet unit comprises a plurality of first sheet magnets and a plurality of second sheet magnets, the first sheet magnets and the second sheet magnets are alternately arranged; and
   a second annular magnet unit, disposed on the fixing portion of one of plurality of magnetic bearings and corresponding to the first annular magnet unit, wherein the second annular magnet unit comprises a plurality of third sheet magnets and a plurality of fourth sheet magnets, the third sheet magnets and the fourth sheet magnets are alternately arranged, wherein a surface, facing to the second annular magnet unit, of the first sheet magnets and a surface, facing to the second annular magnet unit, of the second sheet magnets have different magnetic poles, wherein a surface, facing to the first annular magnet unit, of the third sheet magnets and a surface, facing to the first annular magnet unit, of the fourth sheet magnets have different magnetic poles.

2. The motor according to claim 1, wherein an inner surface of the hollow magnetic conductance pillar is disposed with at least an engagement portion, the rotating shaft comprises at least an engagement slot, the engagement portion and the engagement slot are configured to be engaged with each other thereby coupling the hollow magnetic conductance pillar and the rotating shaft with each other.

3. The motor according to claim 1, wherein the hollow magnetic conductance pillar comprises a plurality of serially-stacked annular silicon steel sheets, an inner surface of the hollow pillar is disposed with a plurality of slits, the first and second magnet units are configured to be engaged with the hollow magnetic conductance pillar through the slits.

4. The motor according to claim 1, wherein the rotor module further comprises a coating portion configured to coat the hollow pillar.

5. The motor according to claim 1, wherein a first end of the rotating shaft passes through the fixing portion and the rotating portion of a first of the plurality of magnetic bearings and extends out of the shell, wherein the rotating portion of a second of the plurality of magnetic bearing coats a second end of the rotating shaft.

6. The motor according to claim 1, wherein two ends of the rotating shaft pass through the fixing portions and the rotating portions of the magnetic bearings and extend out of the shell.

7. The motor according to claim 1, wherein each first magnet unit and each second magnet unit respectively comprise a plurality of sheet magnets, the sheet magnets are serially stacked in a direction from the outer surface of the hollow pillar toward an inner surface of the hollow pillar, wherein in each first magnet unit, two contacting surfaces of the adjacent two sheet magnets have the same magnetic pole, wherein in each second magnet unit, two contacting surfaces of the adjacent two sheet magnets have the same magnetic pole.

* * * * *